(12) United States Patent
Botea et al.

(10) Patent No.: US 10,296,601 B2
(45) Date of Patent: May 21, 2019

(54) IDENTIFYING ABANDONED OBJECTS

(71) Applicant: INTERNATIONAL BUSINESS MACHINES CORPORATION, Armonk, NY (US)

(72) Inventors: Adi I. Botea, Dublin (IE); Bei Chen, Dublin (IE); Akihiro Kishimoto, Dublin (IE); Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 15/436,126

(22) Filed: Feb. 17, 2017

(65) Prior Publication Data

US 2018/0239988 A1    Aug. 23, 2018

(51) Int. Cl.
*G06K 9/00* (2006.01)
*G06F 17/30* (2006.01)

(52) U.S. Cl.
CPC ........ *G06F 17/30268* (2013.01); *G06K 9/00* (2013.01)

(58) Field of Classification Search
CPC ........... G06K 9/00771; G06K 9/00805; G06K 9/6267; G06K 9/2036; G06K 9/52; G06F 17/3079; G06F 17/30268
See application file for complete search history.

(56) References Cited

U.S. PATENT DOCUMENTS 7,447,334 B1 * 11/2008 Jiang ................. G06K 9/00362
348/143
7,813,528 B2   10/2010 Porikli et al.

8,107,678 B2   1/2012 Feris et al.
(Continued)

FOREIGN PATENT DOCUMENTS

CN      103093246 A      5/2013
CN      103345180 A     10/2013
(Continued)

OTHER PUBLICATIONS

Sheng-Fuu Lin, et al.,"An automatic detection algorithm of abandoned objects and abandoner for surveillance system", Dec.-Jan. 2016, International Journal of Electrical and Electronics Engineering:vol. 5, pp. 1-8.
(Continued)

*Primary Examiner* — Ali Bayat
(74) *Attorney, Agent, or Firm* — Cantor Colburn LLP; Kurt Goudy

(57) ABSTRACT

Embodiments include method, systems and computer program products for identifying abandoned objects. In some embodiments, first visual media data of an object can be received from a first source. The first visual media data of the object can be processed to identify a type of the object. An identifier associated with the type of the object can be generated. The object can be identified in second visual media data received from a second source. A status of the object can be determined based at least in part on at least one abandonment factor derived from the first visual media data and the second visual media data. The identifier associated with the object and a location associated with the object can be added to a list of objects having the same status, based at least in part on the status of the object.

17 Claims, 5 Drawing Sheets

(56) References Cited

U.S. PATENT DOCUMENTS

| | | | |
|---|---|---|---|
| 8,675,917 B2 | 3/2014 | Brown et al. | |
| 8,983,201 B2* | 3/2015 | Caid et al. | |
| 9,378,632 B2* | 6/2016 | Venetianer | G06F 17/3079 |
| 2004/0125207 A1* | 7/2004 | Mittal | G06K 9/00771 |
| | | | 348/169 |
| 2007/0019181 A1* | 1/2007 | Sinclair | G01C 3/08 |
| | | | 356/4.01 |
| 2010/0157064 A1* | 6/2010 | Cheng | G06K 9/00771 |
| | | | 348/169 |
| 2012/0170902 A1* | 7/2012 | Zhu | H04N 5/76 |
| | | | 386/223 |
| 2015/0294192 A1 | 10/2015 | Lan et al. | |
| 2015/0294431 A1* | 10/2015 | Fiorucci | G06Q 50/26 |
| | | | 705/13 |

FOREIGN PATENT DOCUMENTS

| | | |
|---|---|---|
| CN | 203405577 U | 1/2014 |
| CN | 104422941 A | 3/2015 |
| JP | 2005235133 A | 9/2005 |

OTHER PUBLICATIONS

White pages,"Abandoned Bikes" Normans Media Limited,M2 Press WIRE, Dec. 16, 2010, p. 1-2.

* cited by examiner

IDENTIFYING ABANDONED OBJECTS

BACKGROUND

The present invention relates to object identification, and more specifically, to methods, systems and computer program products for identifying abandoned objects such as bicycles.

Bicycles have become an integrated component of many cities. People often utilize bicycles for both utilitarian purposes as well as for pleasure. However, as the number of bicycles in a city increase and because the cost of bicycles are relatively low, there have been instances where abandoned bicycles have become an issue. As the number of abandoned bicycles increases, several problems can arise. For instance, abandoned bicycles can take away space, which is often an important commodity in a dense area, such as a city. Abandoned bicycles can also pose safety risks, as they can block sidewalks, parking spaces, and other common areas utilized by other people. Bicycles that have protruding parts can also pose a safety risk to those that are near the objects and can fall onto them and get hurt.

SUMMARY

In accordance with one or more embodiments of the invention, a computer-implemented method for identifying abandoned bicycles is provided. In some embodiments of the method, first visual media data of the object can be received from a first source, wherein the first visual media data of the object comprises geolocation data and timestamp data. The first visual media data of the object can be processed to identify a type of the object. An identifier associated with the type of the object can be generated. The object in second visual media data received from a second source can be identified. A status of the object can be determined based at least in part on at least one abandonment factor derived from the first visual media data and the second visual media data. The identified associated with the object and a location associated with the object can be added to a list of objects having a same status based at least in part on the status of the object.

In one or more embodiments, a computer program product for identifying abandoned bicycles is provided. The computer program product includes a computer readable storage medium having program instructions embodied therewith, the program instructions readable by a processing circuit to perform a method. In some embodiments of the method, first visual media data of the object can be received from a first source, wherein the first visual media data of the object comprises geolocation data and timestamp data. The first visual media data of the object can be processed to identify a type of the object. An identifier associated with the type of the object can be generated. The object in second visual media data received from a second source can be identified. A status of the object can be determined based at least in part on at least one abandonment factor derived from the first visual media data and the second visual media data. The identified associated with the object and a location associated with the object can be added to a list of objects having a same status based at least in part on the status of the object.

In one or more embodiments, a system can include a processor in communication with one or more types of memory. The processor can be configured to 2receive first visual media data of the object from a first source, wherein the first visual media data of the object comprises geolocation data and timestamp data. The first visual media data of the object can be processed to identify a type of the object. An identifier associated with the type of the object can be generated. The object in second visual media data received from a second source can be identified. A status of the object can be determined based at least in part on at least one abandonment factor derived from the first visual media data and the second visual media data. The identified associated with the object and a location associated with the object can be added to a list of objects having a same status based at least in part on the status of the object.

BRIEF DESCRIPTION OF THE DRAWINGS

The forgoing and other features, and advantages of the invention are apparent from the following detailed description taken in conjunction with the accompanying drawings in which.

DETAILED DESCRIPTION

Figure 1:
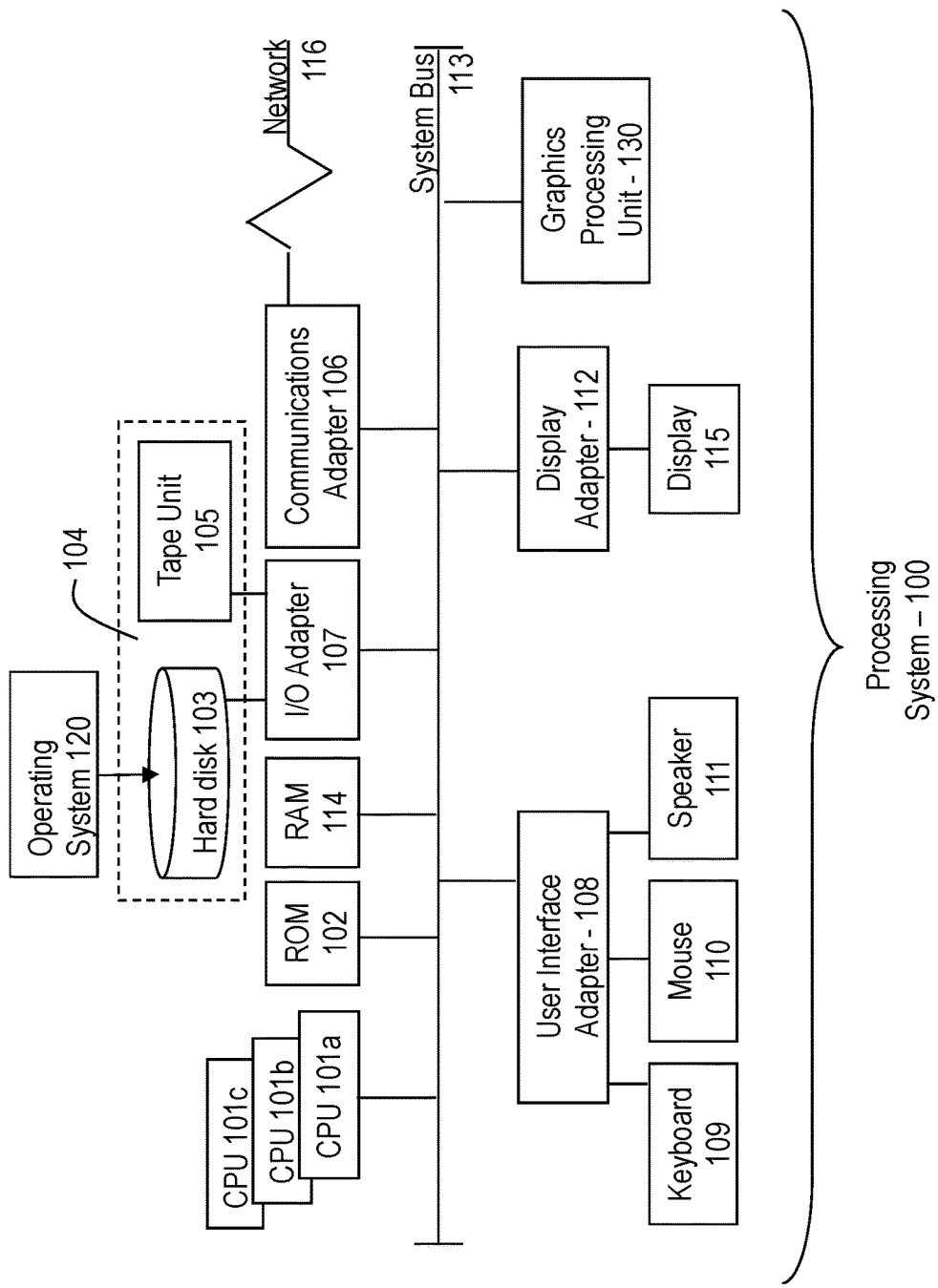
FIG. 1 is a block diagram illustrating one example of a processing system for practice of the teachings herein.

In accordance with exemplary embodiments of the invention, described herein are methods, systems and computer program products for identifying the status of an object. In some embodiments of the invention, the state includes identifying that the object has been abandoned based at least in part on an examination of at least one abandonment factor. In some embodiments of the invention, the object includes bicycles. In some embodiments, the "abandonment factors" include how long the bicycle has been at a specific location, that the bicycle has been in the same position for a specified duration, that the bicycle has been in the location all day or repeatedly leaves and comes back, and that predetermined features have been identified (e.g., missing wheels, bent wheels, rusty parts, and the like).

The systems and methods described herein are directed to obtaining visual media data, such as photographs and video, from one or more users (e.g., via crowdsourcing), processing the visual media data to identify bicycles, and determining that the identified bicycles have been abandoned. In some embodiments, the bicycles identified as abandoned are added to a list. The list can be made available to a group of users, such as city officials, who can use the list to remove the abandoned bicycles from the identified locations. By using crowdsourcing to obtain the visual media data (e.g., multiple users can capture the visual media data and transmit the data to a central server for processing), the system can obtain and analyze data that has spatial and temporal dimensions associated with an identified location. Although described in the context of abandoned bicycles, the systems and methods described herein can be applied to any type of inanimate object that needs to be monitored to identify abandonment and flagged for removal or other action.

In some embodiments, a user can have a client application on their user device. The client application can be used to take a picture of one or more possibly abandoned bicycles. The picture can be embedded with geolocation and timestamp data. In some embodiments, the client application can generate a message that includes the picture or video and can enable a user to add a comment, map, social media data, or the like to the message. The message can be sent to a server. The server can process the visual media data and can identify one or more bicycles. The server can further determine that the bicycle is known to the system using physical features of the bicycle that are identified across different photos or videos taken by different people from different angles. For instance, the system can identify a bicycle using physical features, such as color, shape, size, accessories (e.g., mirrors, baskets, bells, etc.), customizations, visual accessories (e.g., stickers, decals, etc.). The system can use identified landmarks in the visual media data in conjunction with the geolocation data to determine the specific location of the bicycle. Examples of landmarks can include buildings, lampposts, street signs, or the like. By using spatial and temporal dimensions, the system can determine that the identified bicycle is abandoned by determining and evaluating at least one of multiple "abandonment factors" such as how long the bicycle has been at a specific location, that the bicycle has been in the same position for a specified duration, that the bicycle has been in the location all day or repeatedly leaves and comes back, and that predetermined features have been identified (e.g., missing wheels, bent wheels, rusty parts, and the like).

Upon determining that the status of the bicycle is that it is likely abandoned, the system generated bicycle identifier and associated location can be added to a list. The list can be made available to a group of users, such as city officials, so that the users can use the list to remove abandoned bicycles or take other actions.

Referring to FIG. 1, there is shown a processing system 100 for implementing the teachings of the present invention according to one or more embodiments described herein. The system 100 has one or more central processing units (processors) 101a, 101b, 101c, etc. (collectively or generically referred to as processor(s) 101). In one embodiment, each processor 101 can include a reduced instruction set computer (RISC) microprocessor. Processors 101 are coupled to system memory 114 and various other components via a system bus 113. Read only memory (ROM) 102 is coupled to the system bus 113 and can include a basic input/output system (BIOS), which controls certain basic functions of system 100.

FIG. 1 further depicts an input/output (I/O) adapter 107 and a communications adapter 106 coupled to the system bus 113. I/O adapter 107 can be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 can be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which can include a graphics adapter to improve the performance of graphics intensive applications and a video controller. In one embodiment, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which can include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
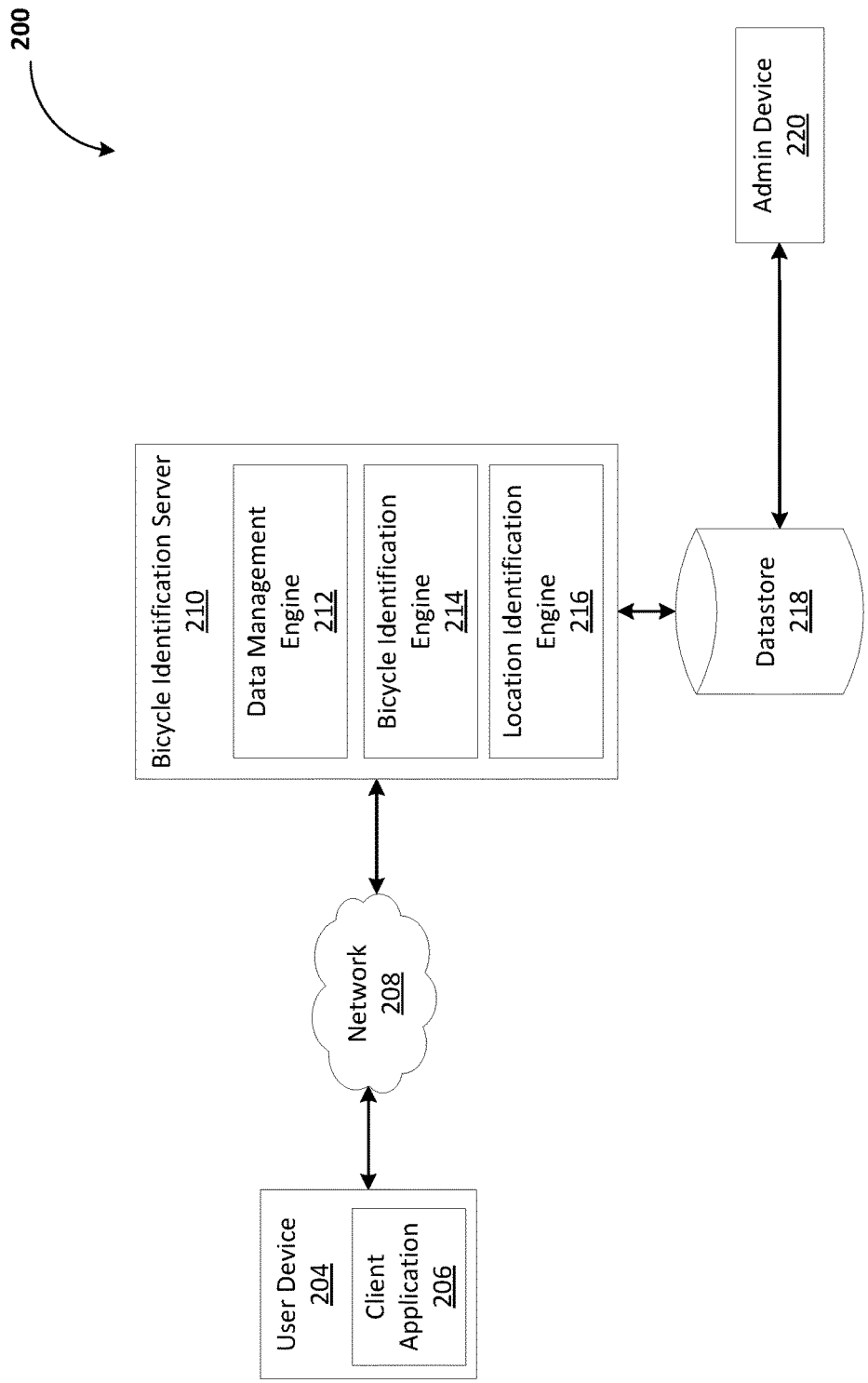
FIG. 2 is a block diagram illustrating a computing system in accordance with an one or more embodiments of the invention.

Referring now to FIG. 2, there is illustrated a computing system 200 in accordance with one or more embodiments of the invention. As illustrated, the computing system 200 can include, but is not limited to, a user device 204, a bicycle identification server 210, a datastore 218, and/or an administrative (admin) device 220 connected over one or more networks 208. In some embodiments, the user device 204 can include a client engine 206. In some embodiments, the bicycle identification server 210 can include a data management engine 212, a bicycle identification engine 214, and/or a location identification engine 216.

In some embodiments, the user device 204 can be any type of computing device, such as a computer, laptop, tablet, smartphone, wearable computing device, server, etc. The user device 204 can include one or more applications, such as a web browser or dedicated client application 206 that can communicate with the application server 210 over one or more networks 208.

The client application 206 can include computer-readable instructions that, in response to execution by the processor(s) 101, cause operations to be performed including facilitating the capture of visual media data, such as video or photographs. The visual media data can be embedded with geolocation data and/or timestamp data. Additionally, the client application 206 can generate a message including the visual media data and additional data provided by the user. Examples of additional data include a map of the location of the object, comments provided by the user (e.g. audio or text), social media data, or the like. The client application 206 can transmit the message over one or more networks 208 to a bicycle identification server 210. Although described in the context of a client-server architecture, the systems and methods described herein can be implemented using cloud computing techniques and architecture.

The network(s) 208 can include, but are not limited to, any one or a combination of different types of suitable communications networks such as, for example, cable networks, public networks (e.g., the Internet), private networks, wireless networks, cellular networks, or any other suitable private and/or public networks. Further, the network(s) 208 can have any suitable communication range associated therewith and can include, for example, global networks (e.g., the Internet), metropolitan area networks (MANs), wide area networks (WANs), local area networks (LANs), or personal area networks (PANs). In addition, the network(s) 208 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof In some embodiments, the bicycle identification server 210 can be any type of computing device with network access, such as a computer, laptop, server, tablet, smartphone, wearable computing devices, or the like. The bicycle identification server 210 can be part of a cloud computing environment that provides a specific functionality to the user device 204, such as a software-as-a-service functionality.

The data management engine 212 can include computer-readable instructions that, in response to execution by the processor(s) 101, cause operations to be performed including obtaining visual media data from a user device 204. In some embodiments, the data management engine 212 can receive a stream of data, which can include visual media data and additional information from the client application 206 of the user device 204. The data management engine 212 can parse the data received from the user device 204 and transmit the visual media data and additional information received from the user device 204 to a bicycle identification engine 214.

The bicycle identification engine 214 can include computer-readable instructions that, in response to execution by the processor(s) 101, cause operations to be performed including obtaining data from the data management engine 212. The bicycle identification engine 212 can process the visual media data to identify one or more bicycles. In some embodiments, the bicycle identification engine 214 can identify the bicycle(s) using different physical features or characteristics of the bicycles. For example, the bicycle identification engine 214 can determine colors, size, position, accessories (e.g., basket, streamers, water bottle holder), visual markers (e.g., stickers, decals, text) of the bicycle. In some embodiments, the bicycle identification engine 214 can use the different physical characteristics of the bicycle to generate an identifier to associate with the bicycle. In some embodiments, the bicycle identification engine 214 can communicate with a datastore 218 to check that the identifier already exists. If the identifier does not exist, the bicycle identification engine 214 can determine to add the identifier associated with the bicycle and a location determined by the location identification engine 216 to the datastore.

In some embodiments, the bicycle identification engine 214 can determine that the identifier exists in the datastore 218. In some embodiments, the bicycle identification engine 214 can obtain location information (e.g., from the location identification engine) associated with the identified bicycle to augment the data associated with the identified bicycle.

In some embodiments, the information associated with an identified bicycle can be used by the bicycle identification engine 214 to determine that the bicycle has been abandoned. In some embodiments, the bicycle identification engine 214 can determine that the bicycle has been abandoned by generating a confidence score. In some embodiments, the confidence score can be calculated using additional information associated with the identified bicycle. For example, the bicycle identification engine 214 can determine that the bicycle has been in the same location for a period of time that exceeds a predetermined threshold. Additionally, the bicycle identification engine 214 can identify physical features, such as missing wheels, damaged wheels, rust, and the like, to calculate the confidence score. For example, each pre-determined physical feature, such as a missing wheel, can be associated with a weighted value (e.g., missing while has a higher weighted value than a dented wheel).

In some embodiments, the confidence score can be associated with a bicycle identifier and can be stored in the list of abandoned bicycles with the identifier associated with the bicycle. The confidence scores associated with bicycles can be updated as new visual media data is obtained or at pre-determined periodic intervals.

The location identification engine 216 can include computer-readable instructions that, in response to execution by the processor(s) 101, cause operations to be performed, including obtaining visual media data from the data management engine 212 and bicycle identification data (e.g., bicycle identifier) from the bicycle identification engine 214. The location identification engine 216 can use the geolocation data associated with the visual media data to determine an approximate location of an identified bicycle. Additionally, the location identification engine 216 can process the visual media data to identify one or more landmarks in the visual media data. The location identification engine 216 can use the landmarks and the precise location from which the visual media data was captured to determine the location of an identified bicycle. The location identification engine 216 can transmit the location data associated with an identified bicycle to the bicycle identification engine 214.

In some embodiments, the admin device 220 can be any type of computing device with network access, such as a computer, laptop, server, tablet, smartphone, wearable computing devices, or the like. The admin device 220 can obtain a list of abandoned bicycles from the datastore 218. The admin device 220 can edit or otherwise modify the list (e.g., update the list as bicycles are removed from identified locations) and can store the changes to the datastore 218.

Figure 3:
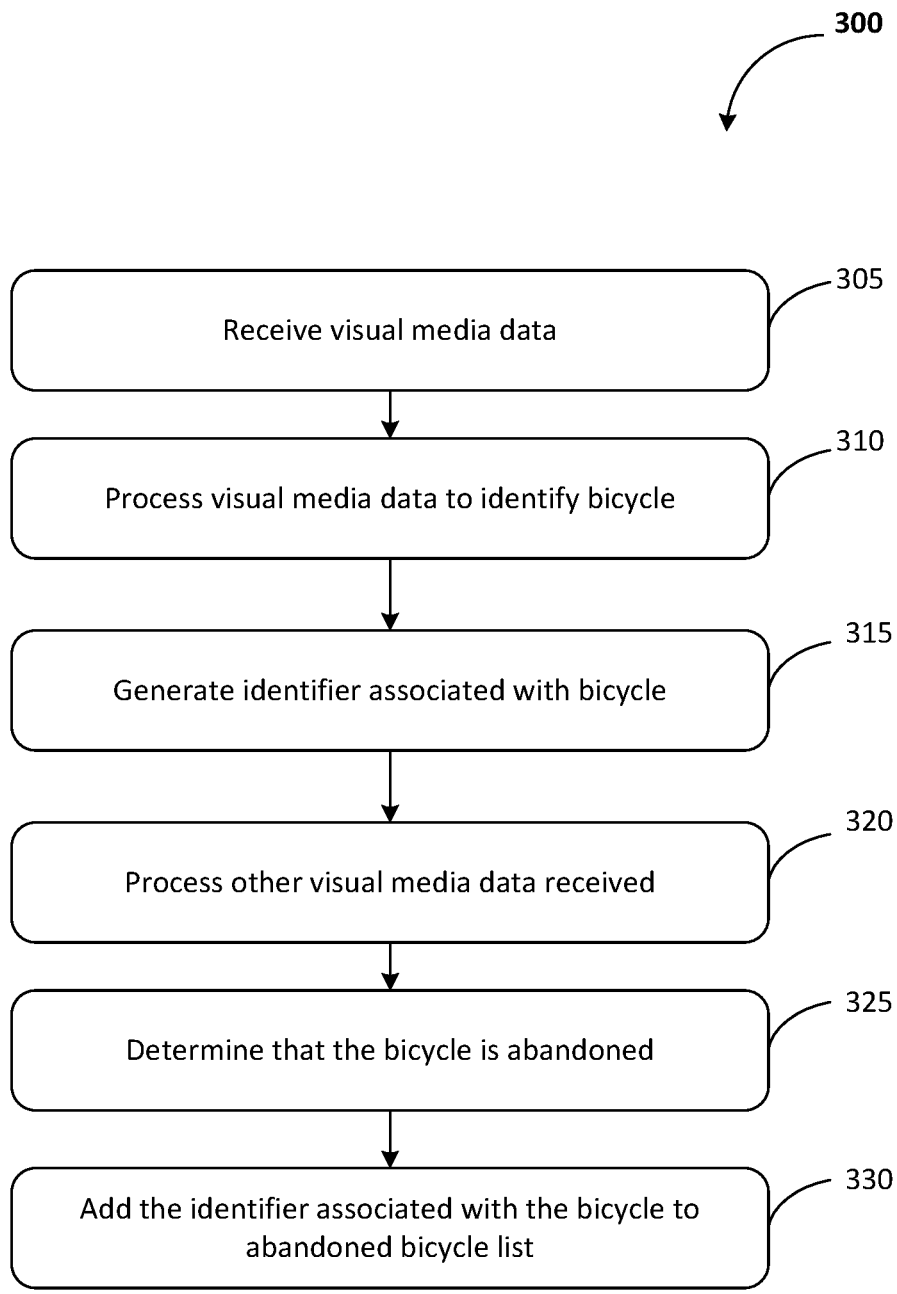
FIG. 3 is a flow diagram of a method for identifying abandoned bicycles in accordance with one or more embodiments of the invention.

Now referring to FIG. 3, a flow diagram of a method 300 for identifying abandoned bicycles or other objects in accordance with one or more exemplary and non-limiting embodiments is depicted. At block 305, visual media data can be received. In some embodiments, a user device 204 can execute a client application 206. The client application 206 can facilitate capturing visual media data, such as photographs or video, using one or more cameras associated with the user device 204. In some embodiments, the client application 206 can associate and/or embed geolocation data and/or timestamp data with the captured visual media data. The client application 206 can generate a message that includes the visual media data of a bicycle to send to the bicycle identification server 210 over one or more networks 208. In some embodiments, the client application 206 can obtain comments in the form a text, a map, and/or social media data (e.g., status updates, status indicators, etc.) to include in the message. The client application 206 can transmit the message to the bicycle identification application 206. Messages can be generated by multiple users using different user devices 204 (e.g., crowd sourcing).

At block 310, the visual media data can be processed to identify a bicycle. In some embodiments, the visual media data can be processed to identify a type of object in the visual media data (e.g., bicycle, car, etc.). In some embodiments, the data management engine 212 can receive the message from the user device 204 and can parse the message to obtain the visual media data from the message. The data management engine 212 can parse the message to obtain additional information provided by a user (e.g., comments, a map, and/or social media data). In some embodiments, the data management engine 212 can parse the message to obtain geolocation and timestamp information. The data management engine 212 can transmit the parsed visual media data and any additional information obtained from the message to the bicycle identification engine 214 and/or the location identification engine 216.

The bicycle identification engine 214 can process the visual media data received from the data management engine 212 to identify one or more objects and types associated with the object. For example, the bicycle identification engine 214 can determine that the visual media data include a vehicle and that the vehicle is a bicycle. In some embodiments, the bicycle identification engine 214 can determine physical attributes associated with the bicycle. Examples of physical attributes or features can include, but are not limited to, color, size, position, accessories, accessory positioning, type, branch, visual markers (e.g., stickers, decals, paint, etc.). The physical attributes can also include any damage or physical anomalies of the bicycle (e.g., missing pedal strap, streamers, broken mirror, etc.).

In some embodiments, the bicycle identification engine 214 can transmit the identifier associated with the object (e.g., bicycle) and/or other information used to identify the object (e.g., bicycle) to the location identification engine 216.

The location identification engine 216 can use the information received from the data management engine 212 and/or the bicycle identification engine 214 to determine a location associated with the identified bicycle. The location identification engine 216 can identify one or more landmarks or other visual cues (e.g., lamppost, building, street sign, etc.) in the visual media data. The location identification engine 216 can use the geolocation information associated with the visual media data to determine the location of the identified bicycle. For example, the geolocation information associated with the visual media data is indicative of the location of the user device 204 used to capture the visual media data. The location identification engine 216 can use an identified landmark from the visual media data as well as the geolocation data to estimate the distance from the user device 204 and/or landmark to determine an approximate location of the bicycle. The location identification engine 216 can transmit the location information associated with the identified bicycle to the bicycle identification engine 214.

At block 315, an identifier associated with the bicycle can be generated. In some embodiments, an identifier associated with a type of an identified object and/or the identified object can be generated. The bicycle identification engine 214 can generate an identifier associated with the bicycle using the physical attributes or features identified by the bicycle identification engine 214. In some embodiments, the identifier can also be generated using geolocation information associated with the visual media data. In some embodiments, the identifier can be generated using the location information determined by the location identification engine 216.

In some embodiments, the bicycle identification engine 214 can compare the generated identifier associated with the bicycle to existing identifiers. In some embodiments, the bicycle identification engine 214 can compare the generated identifier associated with the bicycle to existing identifiers stored in a datastore 218. If the identifier does exist, information associated with the stored identifier can be obtained. The information can include the date the bicycle was initially identified and geolocation information that can indicate that the bicycle has been in the same location or has been identified at different locations.

At block 320, additional visual media data can be received and processed. For example, the additional visual media data can be received from a different user at a similar date and/or time as the visual media data received in block 305 or the additional visual media data can be visual media data obtained from the same user at a different date or time. The additional visual media data can be processed to identify one or more bicycles in the visual media data and compared to previously identified bicycles. In some embodiments, the identifiers associated with the previously identified bicycles can be stored in the datastore 218. In some embodiments, the identifiers can be stored in association with additional information about the previously identified bicycles (e.g., physical attributes, geolocation information with corresponding date and time information, etc.).

In some embodiments, the bicycle identification engine 214 can generate a confidence score associated with the identified bicycle. In some embodiments, the confidence score can be indicative of the likelihood or probability of an identified bicycle being abandoned. The bicycle identification engine 214 can use weighted factors to generate a confidence score associated with an identified bicycle. As the bicycle identification engine 214 continues to receive data from different users at different times (e.g., crowdsourced data), the confidence score associated with an identified bicycle can be updated frequently. For example, the confidence score can be updated or re-generated in response to receiving new visual media data that includes the identified bicycle. In some embodiments, the bicycle identification engine 214 can process incoming visual media data and determine that a previously identified bicycle is in the same location, in the same position several weeks after the initial identification. The bicycle identification engine 214 can then regenerate or update the confidence score associated with the identified bicycle.

At block 325, a determination can be made that the status of the bicycle that the bicycle is likely to have been abandoned. In some embodiments, a status of the object (e.g., bicycle) can be determined based at least in part on at least one abandonment factor derived from the visual media data. Examples of abandonment factors may include, but are not limited to how long an object has been at a specific location, whether the object is in the same position for a specified duration, that the bicycle has been in the location all day or repeatedly leaves and comes back, and the presence or absence of predetermined features (e.g., missing wheels, bent wheels, rusty parts, and the like). In some embodiments, the bicycle identification engine 214 can determine that a bicycle has been abandoned based at least in part on the generated confidence score. In some embodiments, the bicycle identification engine 214 can determine that the bicycle has been abandoned based at least in part on determining and evaluating at least one abandonment factors such as that the bicycle has been identified in a particular location for a period of time exceeding a pre-determined threshold (e.g., bicycle has been in the same position in the same location for over 30 days). The determination can be made based on predetermined thresholds. For example, if the bicycle has a confidence score that exceeds a predetermined threshold then the bicycle can be considered abandoned. In some embodiments, if the bicycle identification engine 214 determines that the bicycle has been in the same position and the same location for fifteen days and the pre-determined threshold is two weeks, then the status of the identified bicycle can be categorized as abandoned.

At block 330, the identifier associated with the bicycle determined to be abandoned can be added to an abandoned bicycle list. In some embodiments, an object can be added to a list of objects having the same status. In some embodiments, the identifier associated with the bicycle can be added to the list with additional information generated or processed from the visual media data. For example, the identifier can be stored in conjunction or in association with the generated confidence score, location information associated with the bicycle, date and time information associated with the bicycle, physical attributes of the bicycle, and the like. The list can be stored on the datastore 218 and can be accessed by devices, such as admin devices 220. The admin devices 220 can access the list and can modify the list to update or remove bicycles that can be removed or otherwise handled.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
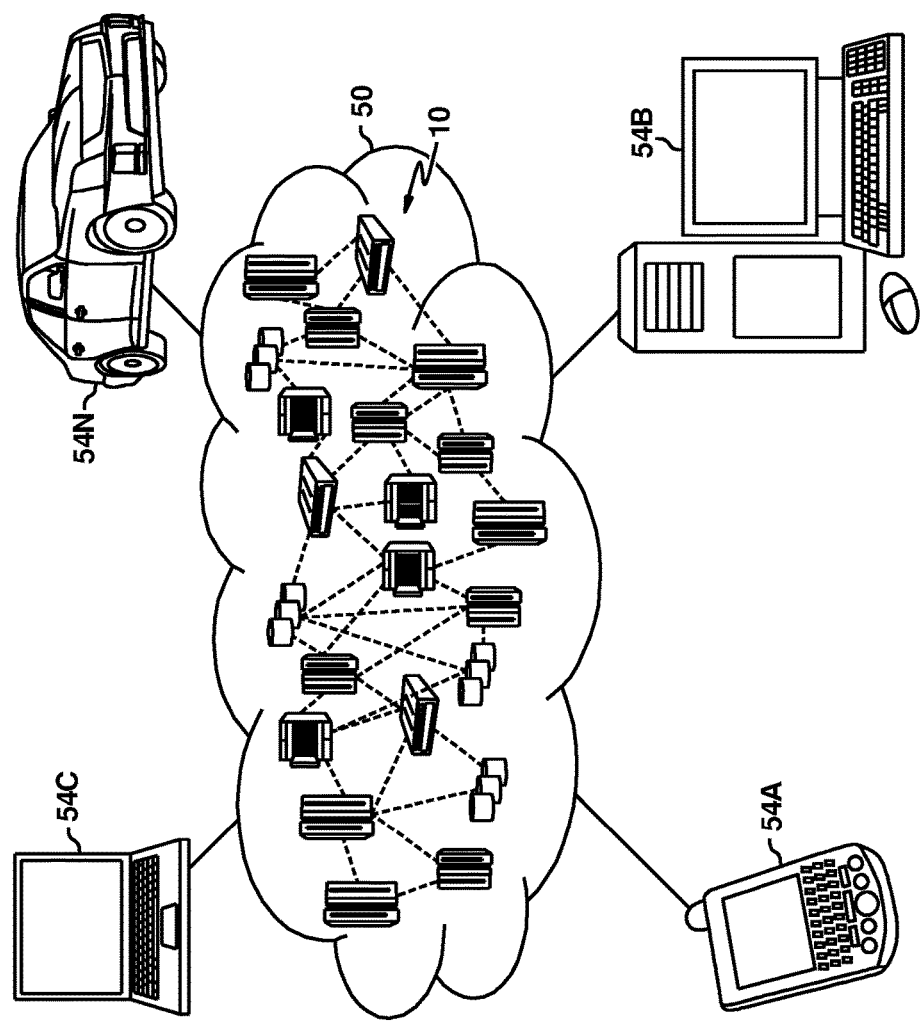
FIG. 4 depicts a cloud computing environment in accordance with one or more embodiments of the invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
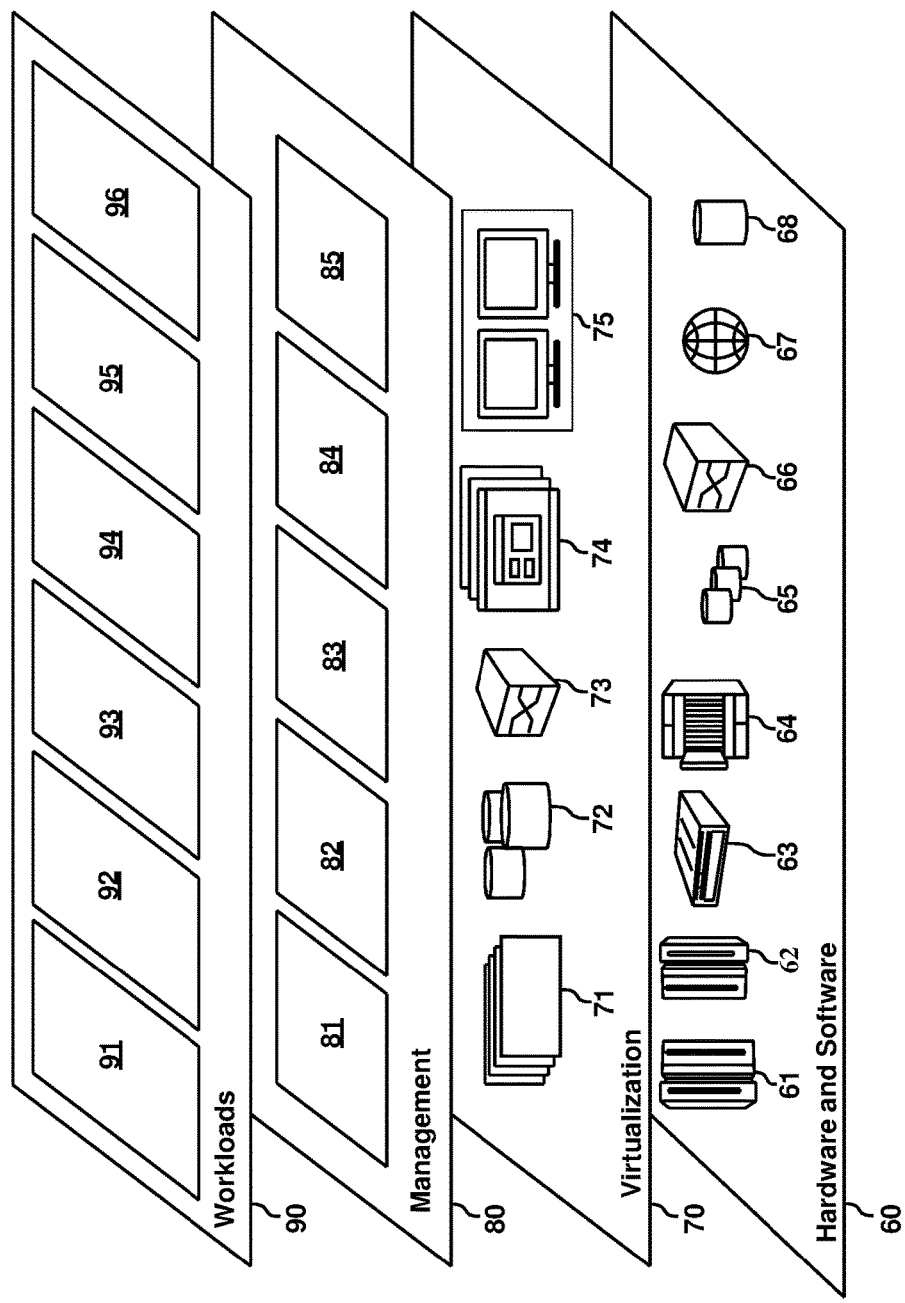
FIG. 5 depicts abstraction model layers in accordance with one or more embodiments of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying abandoned bicycles 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying an object, the method comprising:
   receiving, using a processor, first visual media data of the object from a first source, wherein the first visual media data of the object comprises geolocation data and timestamp data,
   wherein the first visual media data further comprises a map, text comments from a user, or social media data, and
   wherein the object is a bicycle;
   processing, using the processor, the first visual media data of the object to identify a type of the object;
   generating an identifier associated with the type of the object;
   identifying the object in second visual media data received from a second source;
   determining a status of the object based at least in part on at least one abandonment factor derived from the first visual media data and the second visual media data; and
   based at least in part on the status of the object, adding the identifier associated with the object and a location associated with the object to a list of objects having a same status.

2. The computer-implemented method of claim 1, further comprising:
   generating a confidence score associated with the object based at least in part on one or more physical characteristics of the object, location of the object, and a duration indicative of a time between an initial identification of the object and identification of the object at the location associated with the object; and
   adding the confidence score to the list of objects having the same status.

3. The computer-implemented method of claim 1, further comprising:
   determining the location associated with the object using one or more landmarks identified in the first visual media data or the second visual media data and the geolocation data of the first visual media data or geolocation data of second visual media data.

4. The computer-implemented method of claim 1, further comprising:
   determining the location associated with the object by estimating a distance of the object from a location of the first visual media data using the first visual media data.

5. The computer-implemented method of claim 1, wherein processing the first visual media data to identify the object further comprises:
   identifying one or more physical features associated with the object;
   generating metadata indicative of the one or more physical features associated with the object; and
   associating the metadata with the identifier associated with the object.

6. The computer-implemented method of claim 1, further comprising:
   determining that the identifier associated with the object does not exist in a database; and
   adding the identifier associated with the object to the database.

7. A computer program product, the computer program product comprising a computer readable storage medium having program instructions embodied therewith, the program instructions readable by a processing circuit to cause the processing circuit to perform a method comprising:
   receiving first visual media data of the object from a first source, wherein the first visual media data of the object comprises geolocation data and timestamp data,
   the first visual media data further comprises a map, text comments from a user, or social media data, and
   wherein the object is a bicycle;
   processing the first visual media data of the object to identify a type of the object;
   generating an identifier associated with the type of the object;
   identifying the object in second visual media data received from a second source;
   determining a status of the object based at least in part on at least one abandonment factor derived from the first visual media data and the second visual media data; and based at least in part on the status of the object, adding the identifier associated with the object and a location associated with the object to a list of objects having a same status.

8. The computer program product of claim 7, wherein the method further comprises:
   generating a confidence score associated with the object based at least in part on one or more physical characteristics of the object, location of the object, and a duration indicative of a time between an initial identification of the object and identification of the object at the location associated with the object; and
   adding the confidence score to the list of objects having the same status.

9. The computer program product of claim 7, wherein the method further comprises:
   determining the location associated with the object using one or more landmarks identified in the first visual media data or the second visual media data and the geolocation data of the first visual media data or geolocation data of second visual media data.

10. The computer program product of claim 7, wherein the method further comprises:
    determining the location associated with the object by estimating a distance of the object from a location of the first visual media data using the first visual media data.

11. The computer program product of claim 7, wherein processing the first visual media data to identify the object further comprises:
    identifying one or more physical features associated with the object;
    generating metadata indicative of the one or more physical features associated with the object; and
    associating the metadata with the identifier associated with the object.

12. The computer program product of claim 7, wherein the method further comprises:
    determining that the identifier associated with the object does not exist in a database; and
    adding the identifier associated with the object to the database.

13. A computer system, comprising:
    a processor in communication with one or more types of memory, the processor configured to:
      receive first visual media data of the object from a first source, wherein the first visual media data of the object comprises geolocation data and timestamp data, the first visual media data further comprises a map, text comments from a user, or social media data, and wherein the object is a bicycle;
      process the first visual media data of the object to identify a type of the object;
      generate an identifier associated with the type of the object;
      identify the object in second visual media data received from a second source;
      determine a status of the object based at least in part on at least one abandonment factor derived from the first visual media data and the second visual media data; and
      based at least in part on the status of the object, add the identifier associated with the object and a location associated with the object to a list of objects having a same status.

14. The computer system of claim 13, wherein the processor is further configured to:
    generate a confidence score associated with the object based at least in part on one or more physical characteristics of the object, location of the object, and a duration indicative of a time between an initial identification of the object and identification of the object at the location associated with the object; and
    add the confidence score to the list of objects having the same status.

15. The computer system of claim 13, wherein the processor is further configured to:
    determine the location associated with the object using one or more landmarks identified in the first visual media data or the second visual media data and the geolocation data of the first visual media data or geolocation data of second visual media data.

16. The computer system of claim 13, wherein the processor is further configured to:
    determine the location associated with the object by estimating a distance of the object from a location of the first visual media data using the first visual media data.

17. The computer system of claim 13, wherein, to process the first visual media data to identify the object, the processor is further configured to:
    identify one or more physical features associated with the object;
    generate metadata indicative of the one or more physical features associated with the object; and
    associate the metadata with the identifier associated with the object.

* * * * *